US012776706B2

(12) United States Patent
Sun et al.

(10) Patent No.: US 12,776,706 B2

(45) Date of Patent: Oct. 27, 2026

(54) SWITCH MODE POWER SUPPLY COMPENSATION

(71) Applicant: Texas Instruments Incorporated, Dallas, TX (US)

(72) Inventors: Yueming Sun, Shanghai (CN); Yuqing Wu, Shanghai (CN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 60 days.

(21) Appl. No.: 18/664,431

(22) Filed: May 15, 2024

(65) Prior Publication Data

US 2025/0357859 A1 Nov. 20, 2025

(51) Int. Cl.
*H02M 3/158* (2006.01)
*H02M 1/00* (2007.01)

(52) U.S. Cl.
CPC ......... *H02M 3/158* (2013.01); *H02M 1/0009* (2021.05); *H02M 1/0016* (2021.05); *H02M 1/0038* (2021.05)

(58) Field of Classification Search
CPC ............. H02M 1/0025; H02M 1/0029; H02M 1/0009; H02M 1/0016; H02M 1/0038; H02M 3/158
See application file for complete search history.

(56) References Cited

U.S. PATENT DOCUMENTS 7,948,224 B2 * 5/2011 Ng .......................... H03F 3/217 323/284
10,996,701 B1 * 5/2021 Wu .......................... G05F 1/575
11,424,672 B2 * 8/2022 Silva .......................... H02M 1/32
11,552,563 B2 * 1/2023 Jovanovic ........... H02M 1/0025
2015/0155784 A1 * 6/2015 Ouyang .............. H02M 3/1563 323/285
2019/0245442 A1 * 8/2019 Cho ........................ G05F 1/565
2021/0234457 A1 7/2021 Silva
2022/0158555 A1 5/2022 Jovanovic
2023/0043741 A1 * 2/2023 Jovanovic ........... H02M 3/1566
2024/0039405 A1 * 2/2024 Wong ..................... H02M 3/158
2024/0235366 A1 * 7/2024 Huang ................ H02M 1/0019

FOREIGN PATENT DOCUMENTS

CN 114527825 B * 3/2024 ............... G05F 3/26
WO 2023280328 A1 1/2023

OTHER PUBLICATIONS

PCT Search Report mailed Jul. 30, 2025.

* cited by examiner

*Primary Examiner* — Sisay G Tiku
(74) *Attorney, Agent, or Firm* — Zhenhai Fu; Charles F. Koch

(57) ABSTRACT

A circuit includes an amplifier, a capacitor, a resistor, a voltage controlled current source (VCCS), and a differentiator circuit. The amplifier has a feedback input, a reference input, and an error output. The capacitor has a first capacitor terminal coupled to the error output, and second capacitor terminal. The resistor has a first resistor terminal coupled to the second capacitor terminal, and a second resistor terminal. The VCCS has a first terminal coupled to the first capacitor terminal, a second terminal coupled to the second resistor terminal, and a VCCS input. The differentiator circuit has an input coupled to the second resistor terminal, and an output coupled to the VCCS input.

20 Claims, 7 Drawing Sheets

SWITCH MODE POWER SUPPLY COMPENSATION

BACKGROUND

A DC-DC converter is an electronic circuit that converts an input direct current (DC) voltage into one or more DC output voltages that are higher or lower in magnitude than the input DC voltage. A DC-DC converter that generates an output voltage lower than the input voltage is termed a buck or step-down converter. A DC-DC converter that generates an output voltage higher than the input voltage is termed a boost or step-up converter.

Some DC-DC converter topologies include a drive/power switch coupled at a switch node to an energy storage inductor/transformer. Electrical energy is transferred through the energy storage inductor/transformer to a load by alternately opening and closing the switch as a function of a switching signal. The amount of electrical energy transferred to the load is a function of the ON/OFF duty cycle of the switch and the frequency of the switching signal. DC-DC converters are widely used in electronic devices, particularly battery powered devices, such as portable cellular phones, laptop computers, and other electronic systems in which efficient use of power is desirable.

SUMMARY

In one example, a circuit includes an amplifier, a capacitor, a resistor, a voltage controlled current source (VCCS), and a differentiator circuit. The amplifier has a feedback input, a reference input, and an error output. The capacitor has a first capacitor terminal coupled to the error output, and second capacitor terminal. The resistor has a first resistor terminal coupled to the second capacitor terminal, and a second resistor terminal. The VCCS has a first terminal coupled to the first capacitor terminal, a second terminal coupled to the second resistor terminal, and a VCCS input. The differentiator circuit has an input coupled to the second resistor terminal, and an output coupled to the VCCS input.

In another example, a circuit includes an amplifier, a comparator, and a compensation circuit. The amplifier has an amplifier output. The amplifier is configured to provide, at the amplifier output, an error signal representing a difference between a converter output voltage and a reference voltage. The comparator is coupled to the amplifier output. The comparator is configured to compare the error signal to a current sense signal. The compensation circuit is coupled to the amplifier output. The compensation circuit includes a resistor, a capacitor, a differentiator circuit, and a VCCS. The resistor and the capacitor are coupled in series. The differentiator circuit is coupled to the resistor. The differentiator circuit is configured to sense a change in voltage across the resistor, and provide a sense signal representing the change in voltage. The VCCS is coupled across the capacitor, and has an input coupled to the differentiator circuit. The VCCS is configured to provide a current to the capacitor responsive to the sense signal.

In a further example, a switching converter includes an output terminal, an amplifier, and a compensation circuit. The output terminal is configured to provide a converter output voltage. The amplifier has a feedback input coupled to the output terminal, a reference input coupled to a voltage reference circuit, and an error output. The compensation circuit is coupled to the error output. The compensation circuit includes a capacitor, a resistor, a differentiator circuit, a VCCS, and a current limiter circuit. The capacitor has a first capacitor terminal coupled to the error output, and second capacitor terminal. The resistor has a first resistor terminal coupled to second capacitor terminal, and a second resistor terminal. The differentiator circuit has an input coupled to the second resistor terminal, and a differentiator output. The VCCS has a first terminal, a second terminal coupled to the second resistor terminal, and a VCCS input coupled to the differentiator output. The current limiter circuit is coupled between the first terminal of the VCCS and the first terminal of the capacitor.

DETAILED DESCRIPTION

Figure 1:
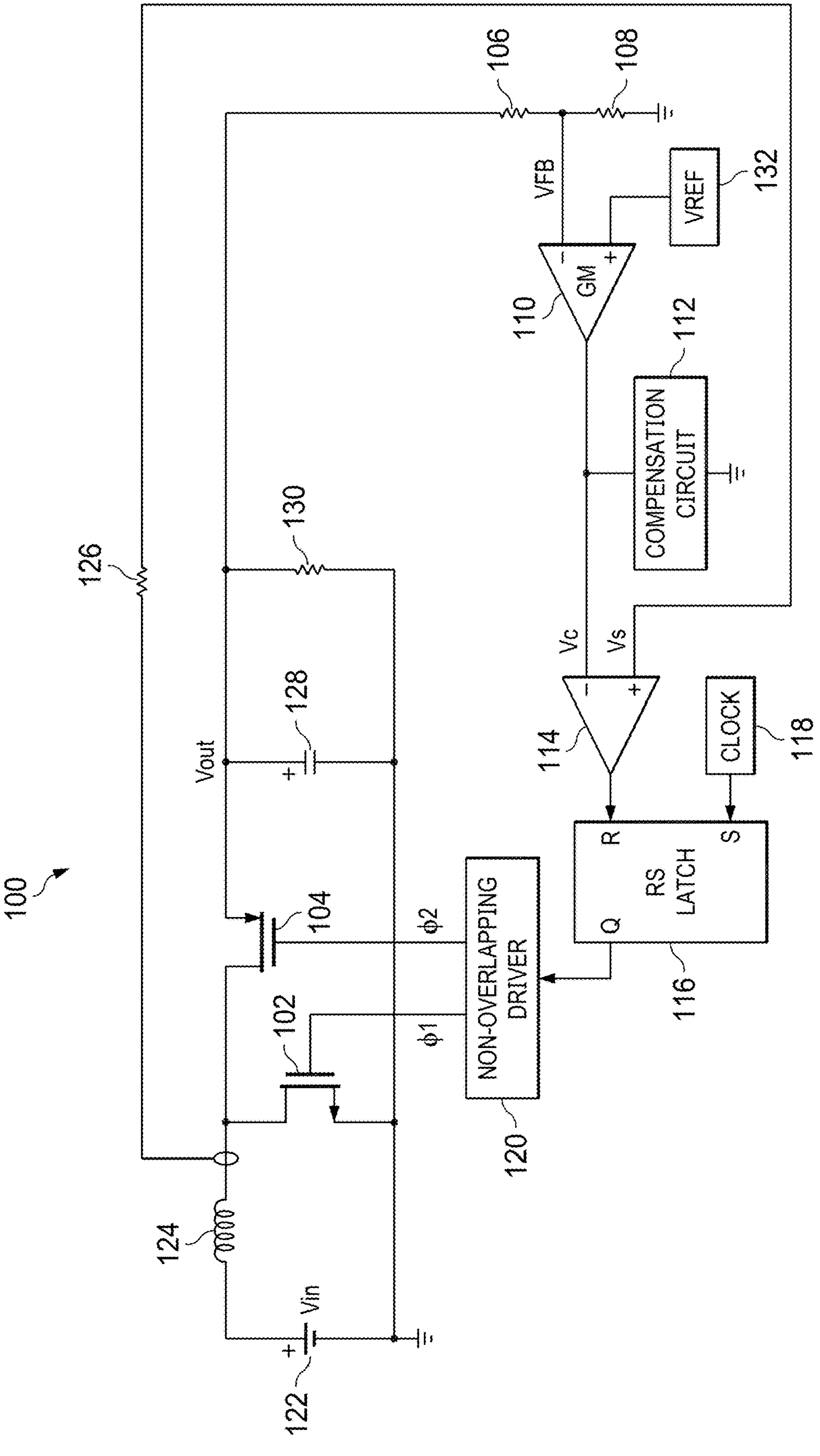
FIG. 1 is schematic diagram of an example switch mode power supply that includes a compensation circuit.

FIG. 1 is schematic diagram of an example switch mode power supply 100. The switch mode power supply 100 includes transistors 102 and 104, an error amplifier 110, a compensation circuit 112, a comparator 114, a latch 116, a clock circuit 118, and a driver circuit 120. In some examples of the switch mode power supply 100, the transistors 102 and 104, error amplifier 110, compensation circuit 112, comparator 114, latch 116, clock circuit 118, and driver circuit 120 may be provided on an integrated circuit. The switch mode power supply 100 also includes resistors 106, 108, and 126, a capacitor 128, an inductor 124, and a voltage source 122, which may be provided external to the integrated circuit. A load circuit coupled to the switch mode power supply 100 is represented by the resistor 130.

In the switch mode power supply 100, switching of the transistor 102 and the transistor 104 charges and discharges the inductor 124 to provide a desired voltage (Vout) at an output terminal of the switch mode power supply 100. The transistor 102 may be an N-channel field effect transistor (NFET) and the transistor 104 may be a p-channel field effect transistor (PFET). A first terminal (e.g., drain) of the transistor 102 is coupled to a first terminal of the inductor 124. A second terminal of the inductor 124 is coupled to the voltage source 122. A second terminal (e.g., source) of the transistor 102 is coupled to a reference terminal (e.g., ground). A control terminal (e.g., gate) of the transistor 102 is coupled to a first output of the driver circuit 120.

A first terminal (e.g., drain) of the transistor 104 is coupled to the first terminal of the transistor 102, and a second terminal of the transistor 104 is coupled to a first terminal of the capacitor 128. A second terminal of the capacitor 128 is coupled to the reference terminal. A control terminal (e.g., gate) of the transistor 104 is coupled to a second output of the driver circuit 120. The driver circuit 120 provides a first control signal Φ1 to turn on the transistor 102 and charge the inductor 124, and provides a second control signal Φ2 to turn on the transistor 104 and discharge the inductor 124. Φ1 and Φ2 may be complementary and non-overlapping.

The resistor 106 and the resistor 108 are coupled as a voltage divider. A first terminal of the resistor 106 is coupled to the second terminal of the transistor 104, and the second terminal of the resistor 106 is coupled to the first terminal of the resistor 108. The second terminal of the resistor 108 is coupled to the reference terminal. The error amplifier 110 compares a feedback voltage VFB provided by the voltage divider to a reference voltage VREF provided by a voltage reference circuit 132. A first input of the error amplifier 110 is coupled to the second terminal of the resistor 106, and a second terminal of the error amplifier 110 is coupled to an output of the voltage reference circuit 132. The error amplifier 110 generates an error voltage Vc that represents the difference between VFB and VREF.

An output of the error amplifier 110 providing Vc is coupled to a first input of the comparator 114. A second input of the comparator 114 is coupled to a current sensor via the resistor 126 (a current sense resistor) providing a current sense signal Vs. The comparator 114 compares Vc and Vs and generates an output signal to reset the latch 116. The latch 116 has a set input coupled to an output of the clock circuit 118. A clock signal provided by the clock circuit 118 sets the latch 116 at a predetermined frequency to set the control signal provided to the driver circuit 120 to a logic high. The output signal provided by the comparator 114 resets the control signal provided to the driver circuit 120 to a logic low.

The compensation circuit 112 is coupled between the output of the error amplifier 110 and the reference terminal. Compensation circuits are employed to stabilize the control loop in switch-mode power supply circuits and other feedback loop-controlled circuits. The type (e.g., type-1, type-2, or type-3) of compensation circuit employed is selected based on various parameters (e.g., output filter component type and size, switching frequency, bandwidth, etc.) of the circuit being controlled. Type-1 compensation can be implemented using a single capacitor to add a pole, but can introduce phase lag that increases the likelihood of instability. A type-2 compensation circuit may include a resistor and capacitor coupled in series (a compensation resistor and a compensation capacitor) to add a pole and a zero. Type-3 compensation may include 3 capacitors and 2 resistors to add three poles and two zeros, and can be complex to implement. Type-2 compensation is widely used in DC-DC switch mode power supply circuits and other circuits.

One approach to enhancing transient performance of a switch-mode power supply employs an aggressive compensation strategy that can be achieved by using a large compensation resistor (a large resistance value). When a transient occurs, the deviation in the power supply's output voltage (VOUT) can generate a current in the error amplifier's output. In turn, the change in VOUT can be represented in the compensation resistor as well as the output of the error amplifier (Vc). Because the inductor current is controlled by Vc in current mode control, a larger compensation resistor can offer a more robust response in the amplitude of the inductor current to address the transient. In a small-signal domain, the large compensation resistor extends the loop bandwidth but sacrifices the mid-band gain, which leads to a longer recovery time. A large compensation resistor slows down the charging and discharging of the compensation capacitor.

Figure 2:
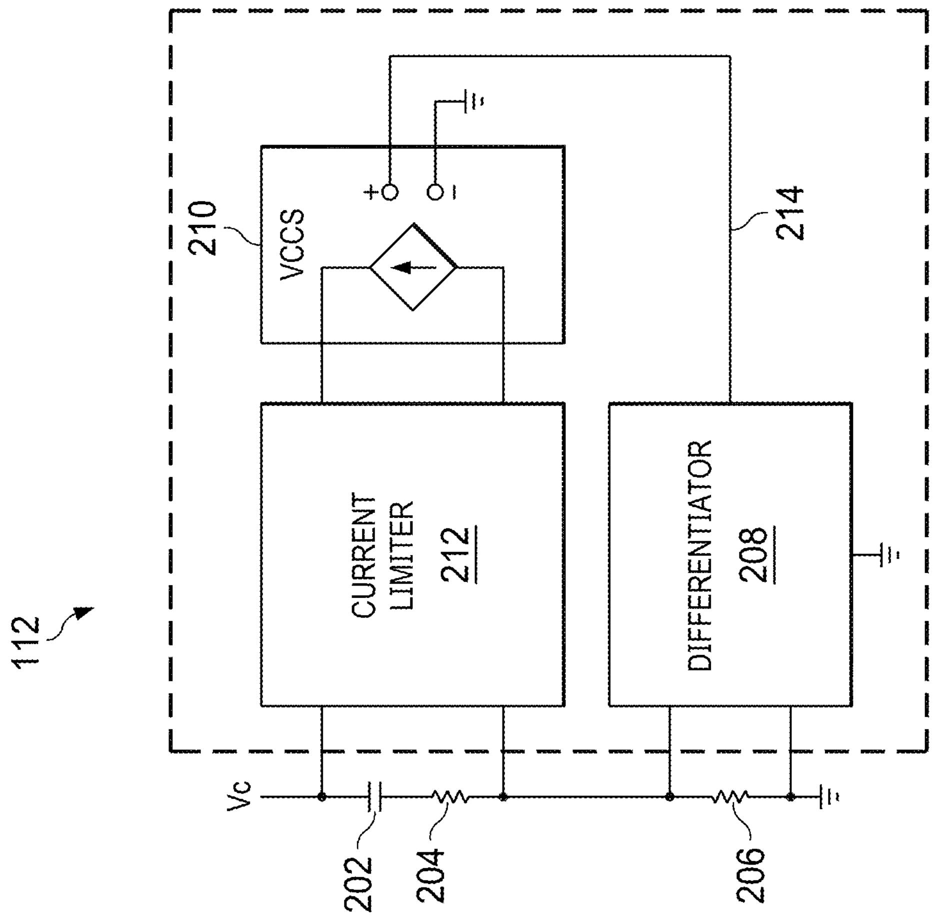
FIG. 2 is a block diagram of an example compensation circuit suitable for use in the switch mode power supply of FIG. 1.

The compensation circuit 112 is a type-2 compensation circuit that provides enhanced transient response with a much shorter recovery time than type-2 compensation circuits that include a large compensation resistor. FIG. 2 is a block diagram of an example of the compensation circuit 112. The compensation circuit 112 includes a capacitor 202 (a compensation capacitor), a resistor 206 (a compensation resistor), a resistor 204, a differentiator circuit 208, a voltage controlled current source (VCCS) 210, and a current limiter circuit 212. The compensation circuit 112 emulates the behavior of a resistor in the capacitor 202 to improve control loop response. The capacitor 202, the resistor 204, and the resistor 206 are coupled in series between the output of the error amplifier 110 and the reference terminal. A first terminal of the capacitor 202 is coupled to the output of the error amplifier 110, and a second terminal of the capacitor 202 is coupled to a first terminal of the resistor 204. A second terminal of the resistor 204 is coupled to a first terminal of the resistor 206, and a second terminal of the resistor 206 is coupled to the reference terminal.

The differentiator circuit 208 detects changes in voltage across the resistor 206, and provides signal 214 representing the rate of change in voltage across the resistor 206 to the VCCS 210. A first input of the differentiator circuit 208 is coupled to the first terminal of the resistor 206, and a second input of the differentiator circuit 208 is coupled to the second terminal of the resistor 206. An output of the differentiator circuit 208, at which the signal 214 is provided, is coupled to a control input of the VCCS 210.

The capacitor 202 is coupled between a current input and a current output of the VCCS 210. The current output of the VCCS 210 is coupled to the first terminal of the capacitor 202, and the current input of the VCCS 210 is coupled to the second terminal of the capacitor 202 through the resistor 204. The resistor 204 introduces a magnified zero in the transfer function of the compensation circuit, which allows for faster response to transients. The VCCS 210 generates a current based on the signal 214. The VCCS 210 may provide current in a range of ±100 nanoamperes in some examples.

The current limiter circuit 212 is coupled between the VCCS 210 and the capacitor 202. The current limiter circuit 212 senses the current flowing from the VCCS 210, and disconnects the current output of the VCCS 210 from the capacitor 202 if the absolute value of the output current of the VCCS 210 is below a threshold current. Discontinuing the flow of current from the VCCS 210 to the capacitor 202 reduces the recovery time of the switch mode power supply 100. Recovery time is the time needed for the output voltage of the switch mode power supply 100 to reach a desired voltage (e.g., a nominal voltage) after a change in the current drawn from the switch mode power supply 100 (a change in load current).

Figure 3:
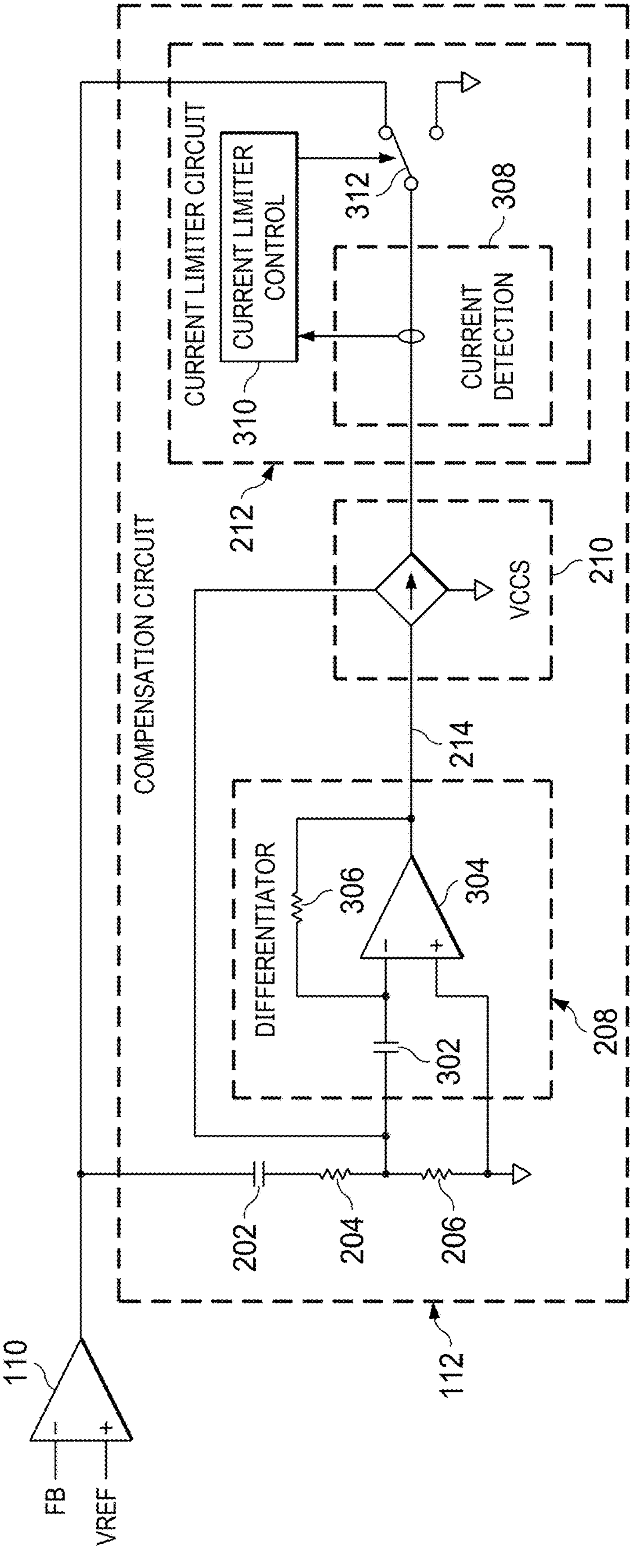
FIG. 3 is a schematic diagram of the example compensation circuit of FIG. 2.

FIG. 3 is a schematic diagram of an example of the compensation circuit 112. The differentiator circuit 208 includes a capacitor 302, an amplifier 304, and a resistor 306. The capacitor 302 is coupled between the first terminal of the resistor 206 and an inverting input of the amplifier 304. A non-inverting input of the amplifier 304 is coupled to the second terminal of the resistor 206. The resistor 306 is coupled between the output of the amplifier 304 and the inverting input of the amplifier 304. A change in voltage across the resistor 206 is transmitted to the amplifier 304 through the capacitor 302. The signal 214 provided at the output of the amplifier 304 is a representation of the rate of change of the voltage across the resistor 206. The output of the amplifier 304 is coupled to the control input of the VCCS 210.

The current limiter circuit 212 includes a current sensor 308, a current limiter control circuit 310, and a switch 312. The current sensor 308 senses the current flowing from the VCCS 210 to the capacitor 202, and provides a sense signal that represents the current flowing from the VCCS 210 to the capacitor 202. The current sensor 308 may include, for example, a sense resistor or a sense transistor coupled between the current output of the VCCS 210 and a first terminal of the switch 312. A second terminal of the switch 312 is coupled to the reference terminal (ground), and a third terminal of the switch 312 is coupled to the first terminal of the capacitor 202. The current limiter control circuit 310 has an input coupled to an output of the current sensor 308 and an output coupled to a control terminal of the switch 312. The sense signal provided at the output of the current sensor 308 is received at the input of the current limiter control circuit 310. The current limiter control circuit 310 compares the sense signal to a threshold signal. The threshold signal represents a selected value (e.g., a threshold value) of current to be provided to the capacitor 202 from the VCCS 210. If the current flowing from the VCCS 210 is above the threshold value, the current limiter control circuit 310 closes the switch 312 (connects the first terminal of the switch 312 to the third terminal of the switch 312), and the current from the VCCS 210 flows to the capacitor 202. If the current flowing from the VCCS 210 is below the threshold value, the current limiter control circuit 310 opens the switch 312 (connects the first terminal of the switch 312 to the second terminal of the switch 312), and the current from the VCCS 210 flows to ground.

Figure 4:
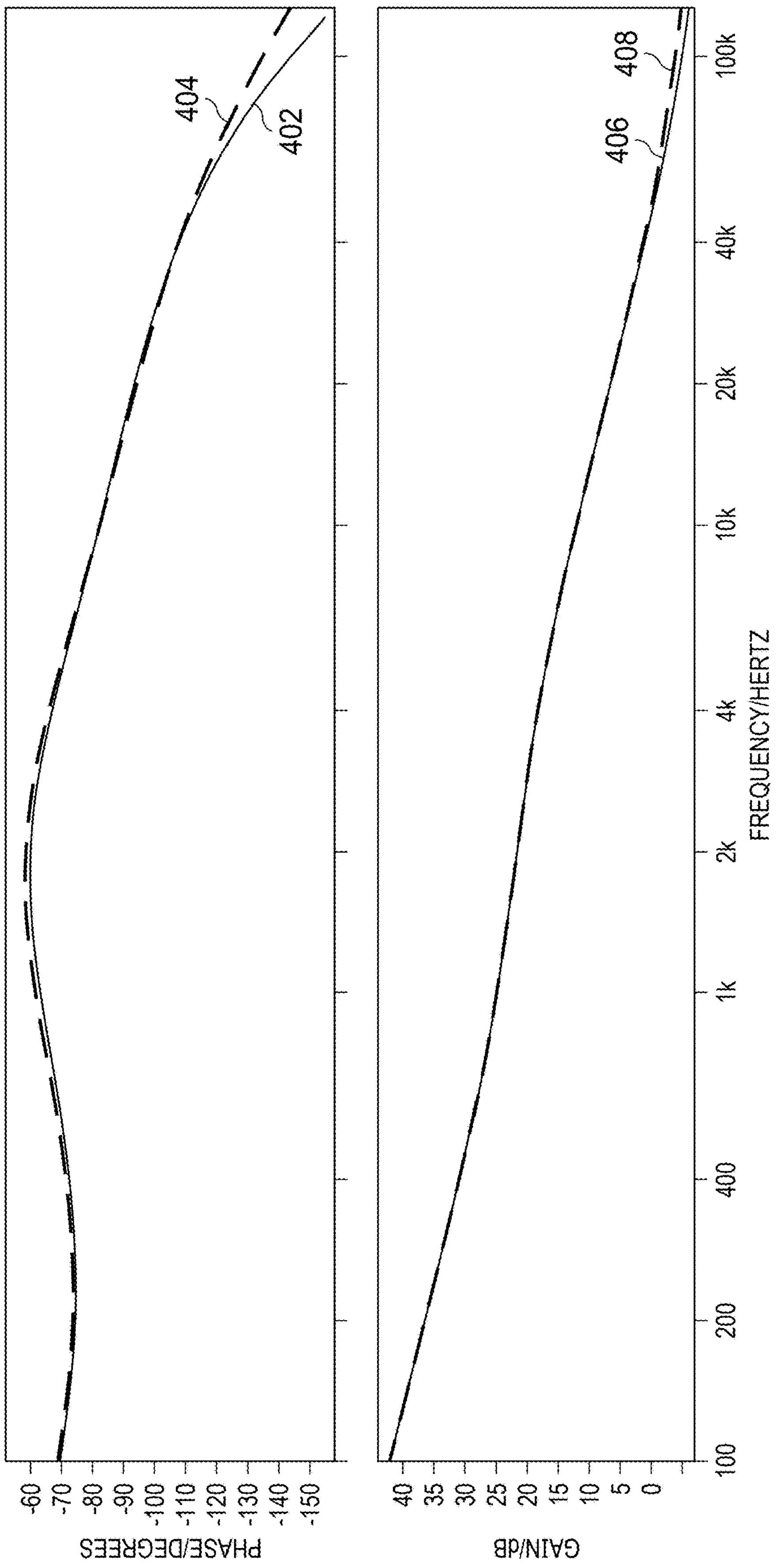
FIG. 4 is a graph showing example gain and phase performance of the compensation circuit of FIG. 2.

FIG. 4 is a graph showing example gain and phase performance of the switch mode power supply 100 with and without the compensation circuit 112. Without the compensation circuit 112, the switch mode power supply 100 includes the resistor 206 and capacitor 202 coupled in series but lacks the resistor 204, the differentiator circuit 208, the VCCS 210, and the current limiter circuit 212. The capacitor 202 may have a capacitance of about 60 picofarads. In the compensation circuit 112, the resistor 206 may have a resistance of about 250 kiloohms. Without the compensation circuit 112, the resistor 206 may have a resistance of about 2.5 megohms. The curves 404 and 406 respectively represent phase and gain of the switch mode power supply 100 without the compensation circuit 112. The curves 402 and 408 respectively represent phase and gain of the switch mode power supply 100 with the compensation circuit 112. FIG. 4 shows that the gain and phase of the switch mode power supply 100 with the compensation circuit 112 are similar to the gain and phase of the switch mode power supply 100 without the compensation circuit 112. Accordingly, with the compensation circuit 112 and lower value resistor 206, the performance of the switch mode power supply 100 is similar to the performance of the switch mode power supply 100 without the compensation circuit 112 and with a higher value resistor 206.

Figure 5:
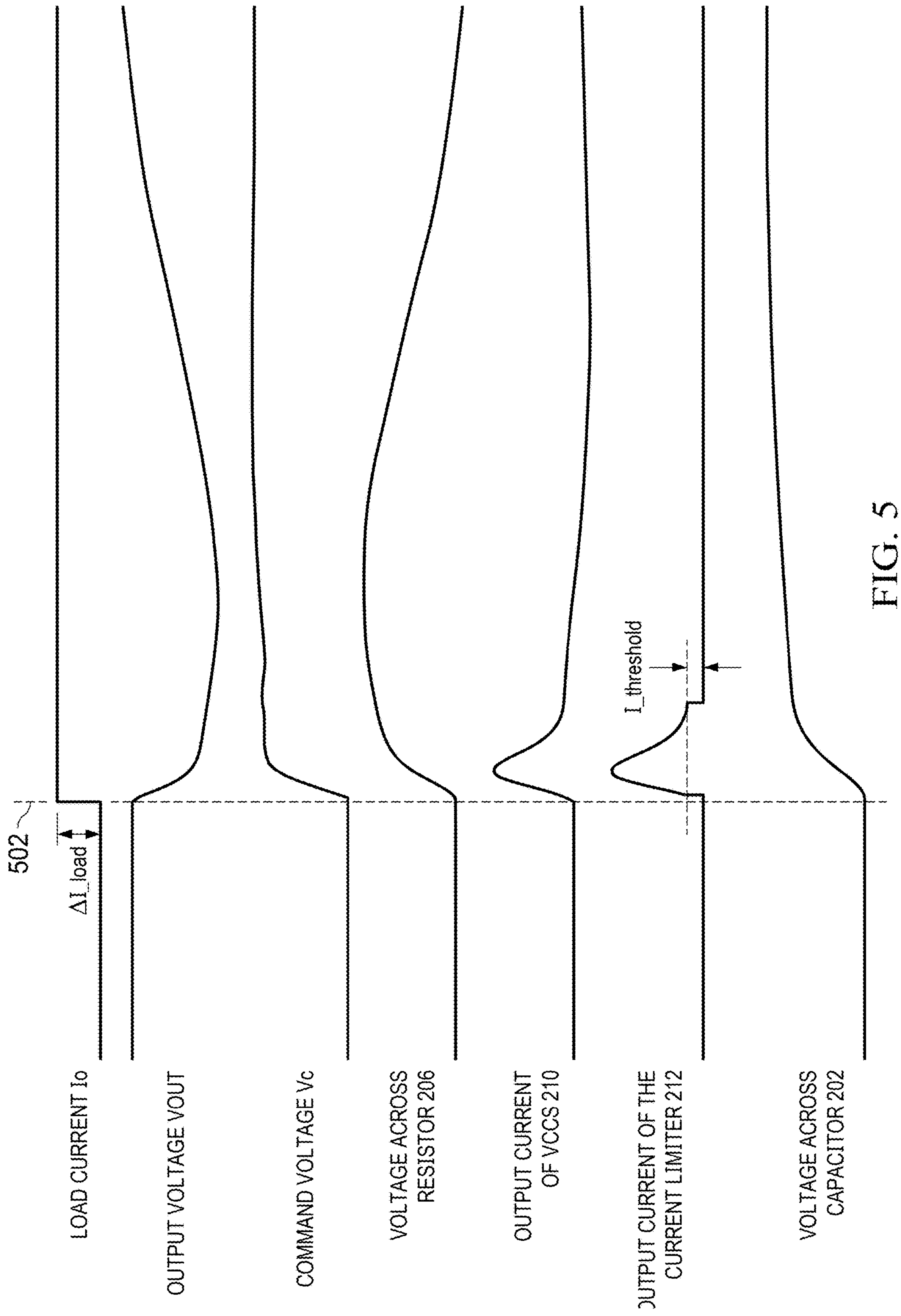
FIG. 5 is a graph showing example signals in the switch mode power supply of FIG. 1 with compensation circuit of FIG. 2.

FIG. 5 is a graph showing example signals in the switch mode power supply 100 with the compensation circuit 112. At time 502, the load current (the current drawn from the output of the switch mode power supply 100) increases as a step ($\Delta$I_load), and the output voltage VOUT of the switch mode power supply 100 drops. Responsive to the drop in VOUT, Vc, provided by the error amplifier 110 increases. The increase in Vc causes the voltage across the resistor 206 to increase. The differentiator circuit 208 senses the increase in voltage across the resistor 206, and provides signal 214 (not shown in FIG. 5) representing the rate of change of the voltage across the resistor 206 to control the VCCS 210. The output current of the VCCS 210 is a function of the rate of change of the voltage across the resistor 206. The output current of the current limiter circuit 212 shows that the current limiter circuit 212 disconnects the VCCS 210 from the capacitor 202 if the current from the VCCS 210 is less than the current threshold (I_threshold). With the current provided by the VCCS 210, the voltage across the capacitor 202 increases relatively quickly. The voltage across the capacitor 202 accounts for a significant proportion of the command voltage Vc. The faster the voltage across the capacitor 202 changes, the faster the inductor current controlled by Vc can change, thereby improving transient response.

Figure 6:
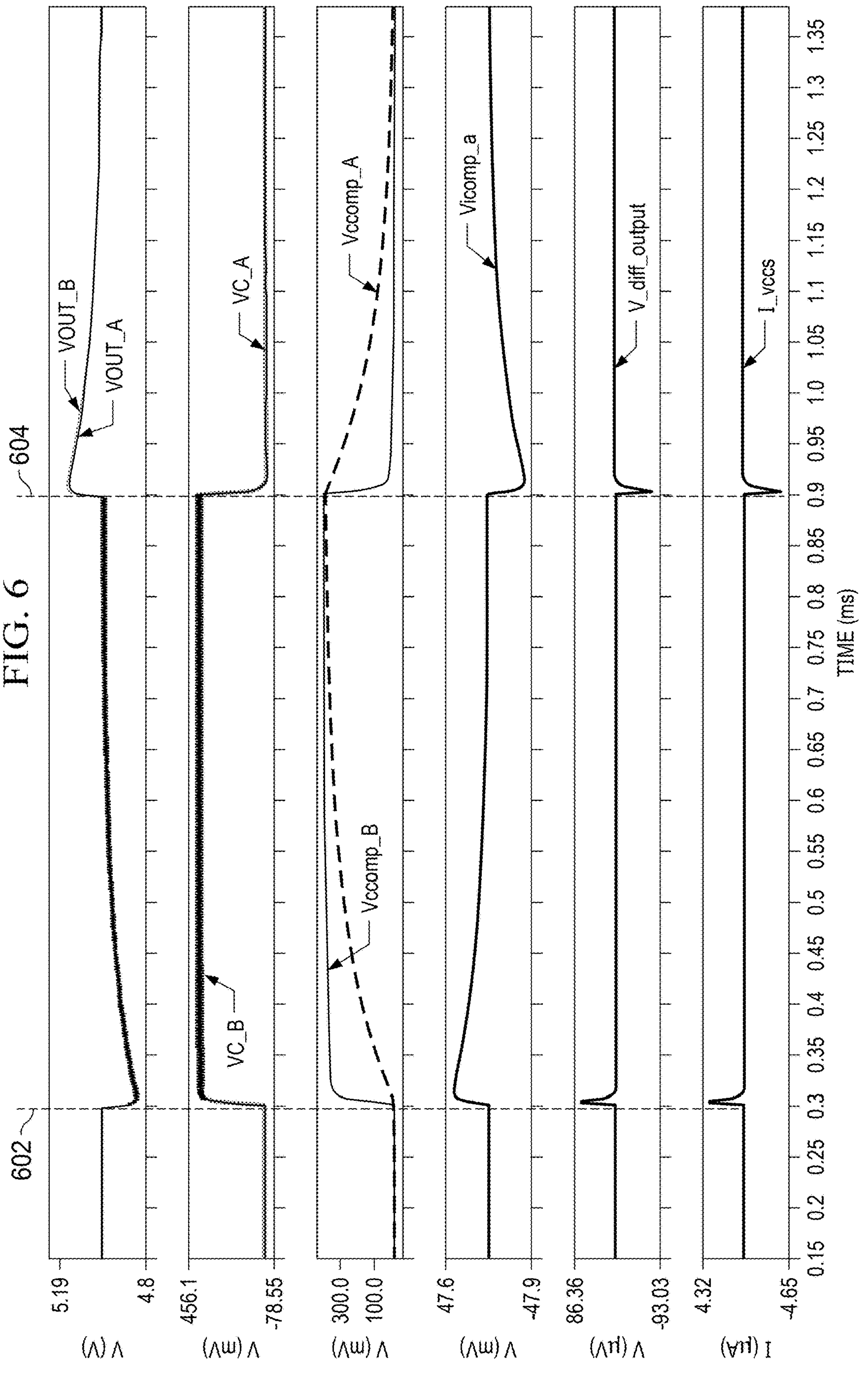
FIGS. 6 and 7 are graphs comparing example signals in the switch mode power supply of FIG. 1 with the compensation circuit of FIG. 1 to example signals in a switch mode power supply without the compensation circuit of FIG. 2.
Figure 7:
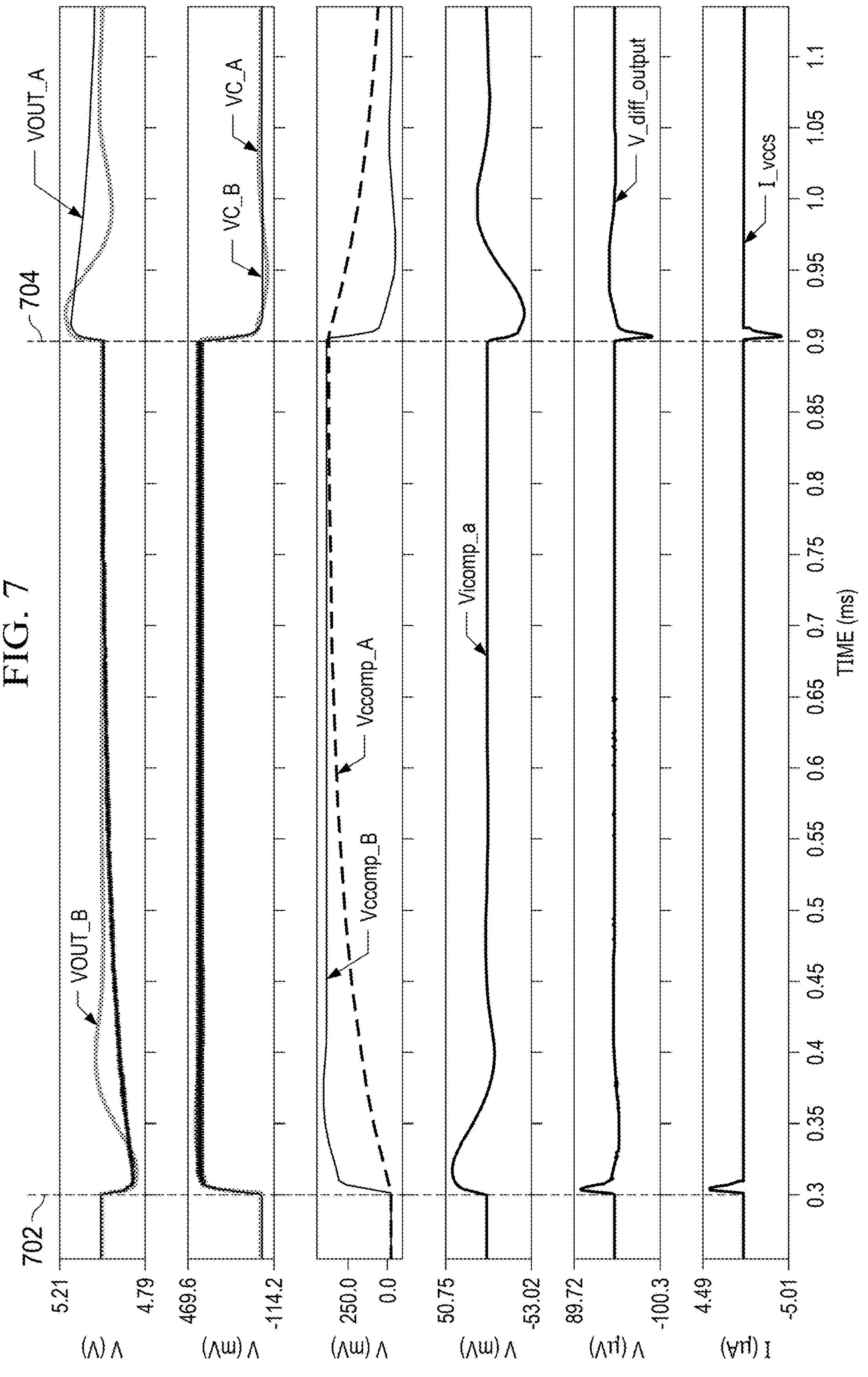

FIGS. 6 and 7 are graphs comparing signals in an example of the switch mode power supply 100 with the compensation circuit 112 to signals in an example of the switch mode power supply 100 without the compensation circuit 112. Without the compensation circuit 112, the switch mode power supply 100 includes the resistor 206 and capacitor 202 coupled in series but lacks the resistor 204, the differentiator circuit 208, the VCCS 210, and the current limiter circuit 212. The capacitor 202 may have a capacitance of about 60 picofarads. In the compensation circuit 112, the resistor 206 may have a resistance of about 250 kiloohms, and the resistor 204 may have a resistance of about 35 kiloohms. Without the compensation circuit 112, the resistor 206 may have a resistance of about 2.5 megohms.

FIG. 6 shows a comparison of signals with the current limiter circuit 212 disabled. In FIG. 6, VOUT_A, VC_A, and Vcomp_A respectively represent the output voltage VOUT, the control voltage Vc, and the voltage across the capacitor 202 in the switch mode power supply 100 without the compensation circuit 112. VOUT_B, VC_B, Vcomp_B, and Vrcomp_a respectively represent the output voltage VOUT, the control voltage Vc, the voltage across the capacitor 202, and the voltage across the resistor 206 in the switch mode power supply 100 with the compensation circuit 112. The signal 214 provided by the differentiator circuit 208 (V_diff_output) and the output current of the VCCS 210 (I_vccs) are also shown in FIG. 6.

In FIG. 6, the load current changes abruptly at times 602 and 604. The load current increases at time 602 and decreases at time 604. The output voltages VOUT and the control voltage Vc of the switch mode power supply 100 with and without the compensation circuit 112 are similar. The voltage across the capacitor 202 differs significantly with and without the compensation circuit 112. Without the compensation circuit 112, the voltage across the capacitor 202 changes relatively slowly due to the large resistance of the resistor 206. With the compensation circuit 112, the voltage across the capacitor 202 changes more quickly as the change in Vc is reflected across the capacitor 202, which improves the transient response of the switch mode power supply 100.

FIG. 7 shows a comparison of signals with the current limiter circuit 212 enabled. In FIG. 7, VOUT_A, VC_A, and Vcomp_A respectively represent the output voltage VOUT, the control voltage Vc, and the voltage across the capacitor 202 in the switch mode power supply 100 without the compensation circuit 112. VOUT_B, VC_B, Vcomp_B, and Vrcomp_a respectively represent the output voltage VOUT, the control voltage Vc, the voltage across the capacitor 202, and the voltage across the resistor 206 in the switch mode power supply 100 with the compensation circuit 112. The signal 214 provided by the differentiator circuit 208 (V_diff_output) and the output current of the VCCS 210 (I_vccs) are also shown in FIG. 7.

In FIG. 7, the load current changes abruptly at times 702 and 704. The load current increases at time 702 and decreases at time 704. With the current limiter circuit 212 enabled, the output voltage VOUT of the switch mode power supply 100 with the compensation circuit 112 recovers much more quickly (e.g., ⅕ the time) than the output voltage VOUT of the switch mode power supply 100 without the compensation circuit 112. In the example of FIG. 7, the differentiator circuit 208 senses the change in voltage across the resistor 206 caused by the changes in load current, and causes the VCCS 210 to generate a current to charge the capacitor 202. The current limiter circuit 212 implements a threshold of about 100 nanoamperes in this example. If the current provided by the VCCS 210 is greater than the threshold, then the current limiter circuit 212 passes the current from the VCCS 210 to the capacitor 202. If the current provided by the VCCS 210 is less than the threshold, then the current limiter circuit 212 disconnects the VCCS 210 from the capacitor 202, and the current provided by the VCCS 210 does not charge the capacitor 202. As explained above, disconnecting the VCCS 210 from the capacitor 202 when the current is less than the threshold significantly reduces the recovery time of the switch mode power supply 100.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) (n-type transistor) or a p-channel FET (PFET)) (p-type transistor)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors, or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input (or transistor control terminal) is the gate, and the current terminals are the drain and source. In the context of a BJT, the control input is the base, and the current terminals are the collector and emitter.

References herein to a FET being "ON" means that the conduction channel of the FET is present and drain current may flow through the FET. References herein to a FET being "OFF" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A circuit comprising:

an amplifier having a feedback input, a reference input, and an error output;

a capacitor having a first capacitor terminal coupled to the error output, and second capacitor terminal;

a resistor having a first resistor terminal coupled to the second capacitor terminal, and a second resistor terminal;

a voltage controlled current source (VCCS) having a first terminal coupled to the first capacitor terminal, a second terminal coupled to the second resistor terminal, and a VCCS input; and a differentiator circuit having an input coupled to the second resistor terminal, and an output coupled to the VCCS input to provide an input signal to the VCCS.

2. The circuit of claim 1, further comprising a current limiter circuit coupled between the first terminal of the VCCS and the first terminal of the capacitor, and between the second terminal of the VCCS and the second terminal of the resistor.

3. The circuit of claim 2, wherein the current limiter circuit is configured to disconnect the VCCS from the first terminal of the capacitor responsive to current flow from the VCCS being less than a threshold current.

4. The circuit of claim 1, wherein:

the resistor is a first resistor;

the input of the differentiator circuit is a first input, and the differentiator circuit has a second input; and the circuit includes a second resistor having a third resistor terminal coupled to the second resistor terminal, and a fourth resistor terminal coupled to the second input of the differentiator circuit.

5. The circuit of claim 4, wherein:

the capacitor is a first capacitor;

the amplifier is a first amplifier; and the differentiator circuit includes:

a second capacitor having a first terminal coupled to second terminal of the resistor, and a second terminal;

a second amplifier having a first input coupled to the second terminal of the second capacitor, a second input coupled to the second terminal of the second resistor, and an output coupled to the VCCS input; and a third resistor coupled between the output of the second amplifier and the first input of the second amplifier.

6. The circuit of claim 1, wherein:

the resistor is a first resistor;

the circuit includes:

a second resistor having a first terminal coupled to an output terminal of a switch mode power supply, and a second terminal coupled to the feedback input of the amplifier; and a third resistor having a first terminal coupled to the second terminal of the second resistor, and a second terminal coupled to a reference terminal.

7. The circuit of claim 1, further comprising a comparator having a first input coupled to the output of the amplifier, a second input coupled to a current sense resistor, and an output coupled to a latch.

8. A circuit comprising:

an amplifier having an amplifier output, the amplifier configured to provide at the amplifier output, an error signal representing a difference between a converter output voltage and a reference voltage;

a comparator coupled to the amplifier output, the comparator configured to compare the error signal to a current sense signal; and a compensation circuit coupled to the amplifier output, the compensation circuit including:

a resistor and a capacitor coupled in series;

a differentiator circuit coupled to two terminals of the resistor, the differentiator circuit configured to sense a change in voltage across the resistor, and provide a sense signal representing the change in voltage; and a voltage controlled current source (VCCS) coupled across the capacitor, and having an input coupled to the differentiator circuit, the VCCS configured to provide a current to the capacitor responsive to the sense signal.

9. The circuit of claim 8, further comprising a current limiter circuit coupled between an output of the VCCS and the capacitor, the current limiter circuit configured to disconnect the VCCS from the capacitor responsive to the current provided by the VCCS being less than a threshold current.

10. The circuit of claim 8 wherein the resistor includes a first resistor and a second resistor coupled in series.

11. The circuit of claim 10, wherein:

the VCCS has a first terminal coupled to a first terminal of the capacitor;

a second terminal of the capacitor is coupled to a first terminal of the first resistor; and a second terminal of the VCCS is coupled to a second terminal of the first resistor.

12. The circuit of claim 11, wherein:

a first terminal of the second resistor is coupled to the second terminal of the first resistor and a first terminal of the differentiator circuit; and a second terminal of the second resistor is coupled to a second terminal of the differentiator circuit.

13. The circuit of claim 10, wherein:

the capacitor is a first capacitor;

the resistor is a first resistor;

the amplifier is a first amplifier; and the differentiator circuit includes:

a second capacitor having a first terminal coupled to second terminal of the resistor, and a second terminal;

a second amplifier having a first input coupled to the second terminal of the second capacitor, a second input coupled to the second terminal of the second resistor, and an output coupled to the input of the VCCS; and a second resistor coupled between the output of the second amplifier and the first input of the second amplifier.

14. The circuit of claim 8, wherein the comparator has a first input coupled to the amplifier output, a second input coupled to a current sense resistor, and an output coupled to a latch.

15. A switching converter comprising:

an output terminal configured to provide a converter output voltage;

an amplifier having a feedback input coupled to the output terminal, a reference input coupled to a voltage reference circuit, and an error output;

a compensation circuit coupled to the error output, the compensation circuit including:

a capacitor having a first capacitor terminal coupled to the error output, and second capacitor terminal;

a resistor having a first resistor terminal coupled to second capacitor terminal, and a second resistor terminal;

a differentiator circuit having an input coupled to the second resistor terminal, and a differentiator output;

a voltage controlled current source (VCCS) having a first terminal, a second terminal coupled to the second resistor terminal, and a VCCS input coupled to the differentiator output; and a current limiter circuit coupled between the first terminal of the VCCS and the first terminal of the capacitor.

16. The switching converter of claim 15, wherein the current limiter circuit is configured to disconnect the VCCS from the first terminal of the capacitor responsive to current flow from the VCCS being less than a threshold current.

17. The switching converter of claim 15, wherein:

the resistor is a first resistor;

the input of the differentiator circuit is a first input, and the differentiator circuit has a second input; and the compensation circuit includes a second resistor having a third resistor terminal coupled to the second resistor terminal, and a fourth resistor terminal coupled to the second input of the differentiator circuit.

18. The switching converter of claim 17, wherein:

the capacitor is a first capacitor;

the resistor is a first resistor;

the amplifier is a first amplifier; and the differentiator circuit includes:

a second capacitor having a first terminal coupled to second terminal of the resistor, and a second terminal;

a second amplifier having a first input coupled to the second terminal of the second capacitor, a second input coupled to the second terminal of the second resistor, and an output coupled to the VCCS input; and a second resistor coupled between the output of the second amplifier and the first input of the second amplifier.

19. The switching converter of claim 15, further comprising a comparator having a first input coupled to the error output of the amplifier, a second input coupled to a current sense resistor, and an output; and a latch coupled to the output of the comparator.

20. The switching converter of claim 15, wherein the current limiter circuit includes:

a current sensor having an input coupled to the first terminal of the VCCS, and an output;

a current limiter control circuit having an input coupled to the output of the current sensor, and an output; and a switch having a first terminal coupled to the first terminal of the VCCS, a second terminal coupled to the first terminal of the capacitor, and a control input coupled to the output of the current limiter control circuit.

* * * * *